United States Patent [19]
Alexander

[11] 3,748,721
[45] July 31, 1973

[54] METHOD OF MAKING COMPOSITES

[75] Inventor: John A. Alexander, Painesville, Ohio

[73] Assignee: TRW Inc., Cleveland, Ohio

[22] Filed: June 22, 1971

[21] Appl. No.: 155,483

Related U.S. Application Data

[62] Division of Ser. No. 20,551, March 18, 1970, Pat. No. 3,649,425.

[52] U.S. Cl............... 29/471.3, 29/471.7, 29/472.3, 219/82, 219/83
[51] Int. Cl............................................ B23k 31/02
[58] Field of Search................ 29/475, 471.1, 471.7, 29/471.3, 472.3; 219/81, 82, 83, 84, 10.49

[56] References Cited
UNITED STATES PATENTS

| | | | |
|---|---|---|---|
| 3,037,275 | 6/1952 | Schmitz | 29/475 X |
| 3,110,961 | 11/1963 | Melill et al. | 29/471.1 |
| 3,156,976 | 11/1964 | Whiting | 29/471.7 X |
| 3,371,407 | 3/1968 | Forsyth et al. | 29/475 |
| 3,419,952 | 1/1969 | Carlson | 29/471.7 X |
| 3,526,953 | 9/1970 | Levinstein | 29/475 X |
| 3,593,600 | 7/1971 | Adams, Jr. et al. | 219/81 X |

*Primary Examiner*—Richard Bernard Lazarus
*Attorney*—Carlton Hill, J. Arthur Gross et al.

[57] ABSTRACT

Components, such as airfoils for jet engines and other complex shaped parts, are provided by fiber-reinforced, high-strength, lightweight metal matrix composites economically prepared to close dimensional tolerances by applying matrix tapes in side-by-side relation to a contoured metal base sheet or foil and building up a body of the desired thickness and shape with super-imposed layers of such applied tapes, which are then covered with a contoured metal cover sheet or foil. Each layer may be bonded to the underlying layer by resistance diffusion bonding, and the cover sheet is bonded to the base sheet prior to hot pressing the entire assembly to the finished size and shape. The tapes are preferably composed of refractory filaments, such as boron, running lengthwise, and embedded in a metal matrix which is fully consolidated. The metal matrix and base and cover sheets are preferably composed of aluminum or titanium alloys, and the interior of the covered article is preferably evacuated prior to pressure bonding.

7 Claims, 6 Drawing Figures

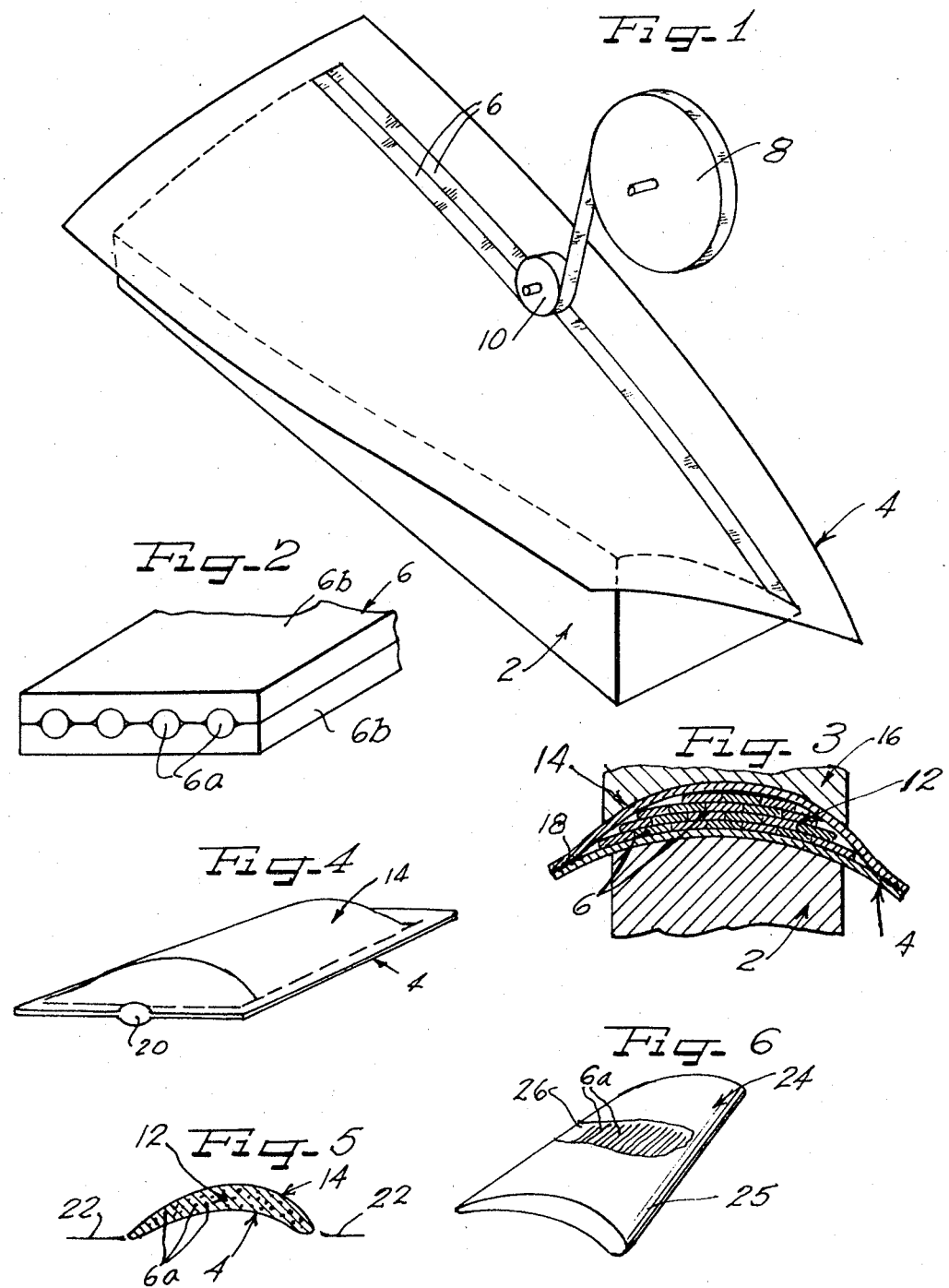

METHOD OF MAKING COMPOSITES

RELATED APPLICATION

This application is a division of my application Ser. No. 20,551 filed Mar. 18, 1970, now U.S. Pat. No. 3,649,425 issued Mar. 14, 1972.

BRIEF SUMMARY OF THE INVENTION

Heretofore, complex, composite shapes or parts, such as jet engine fan blades, were made from laminae cut to predetermined pattern size and shapes, stacked according to pattern, and then consolidated by hot pressing. These methods result in large wastage of material and involve a consolidation operation with a substantial reduction in volume of the stacked laminae. When the laminae were composed of resin-bonded, fiber-reinforced sheets, the reinforcing filaments would be shifted in uncontrolled, random fashion.

The present invention avoids the objections of prior known methods and produces stronger and more accurately shaped composites by building up the body of the component or part from tapes laid edge to edge and layer upon layer on a contoured sheet until the desired shape is obtained. The fully consolidated tapes or strips are laid down by resistance bonding so that the filaments cannot shift on later pressure bonding. A roller is preferably used to resistance bond the tapes. The cover sheet is placed over the built-up body of tapes and is welded to the base sheet to form a complete envelope which is the evacuated, and the whole assembly is placed in a hot pressure die for final consolidation. The final consolidation operation only slightly reduces the volume of the body, in the range of about 2 to 5 percent, and no adverse shift of the filaments can occur.

It is then an object of this invention to provide composites with body portions composed of a plurality of layers of refractory tapes, with each layer composed of a plurality of tapes in side-by-side relation. Another object of this invention is to provide jet engine fan blades with body portions composed of metal matrix reinforced tapes in side-by-side and layer-by-layer relation and covered with a metal sheath.

Another object of this invention is to provide composites of accurate shape, high strength, and low density having body portions composed of layers, with each layer formed from a plurality of tapes in side-by-side relation.

Another object of this invention is to provide an economical method of producing composite shapes avoiding the use of heretofore required complex-shaped, pre-cut laminae.

Another object of the invention is to provide a method of making composites of accurate shape, high strength, and light weight from tapes.

A further object of the invention is to provide a method of making filament-reinforced composites without shifting the filaments during consolidation of the constitutents.

A further object of this invention is to provide a method of making composites with a minimum reduction in volume of the constitutent materials.

Other and further objects of this invention will become apparent to those skilled in this art from the following detailed description of the annexed sheet of drawings which, by way of a preferred embodiment only, illustrates one example of the invention.

BRIEF DESCRIPTION OF THE DRAWING

FIG. 1 is a perspective view of a jet engine fan blade in an initial stage of formation according to this invention;

FIG. 2 is a magnified, fragmentary perspective view of a fiber-reinforced tape used in making composites according to this invention;

FIG. 3 is a transverse cross-sectional view of a turbine fan blade on a contoured die just before final consolidation by heat and pressure according to this invention;

FIG. 4 is a perspective view of a turbine fan blade after complete assembly according to this invention, but prior to final consolidation;

FIG. 5 is a transverse sectional view of the blade of FIG. 4 illustrating the manner in which flash is cut therefrom; and FIG. 6 is a perspective view of a finished turbine fan blade according to this invention.

DETAILED DESCRIPTION OF THE PREFERRED EMBODIMENT

In FIG. 1 of the drawing there is shown a contoured mandril or die 2, the surface of which has the shape of one face of the turbine fan blade or other article to be formed. Supported on the surface of the mandril 2 is a metal base sheet 4 contoured to match the surface of the mandril. The material from which this sheet 4 is made will depend on the service for which the composite is to be used. For example, if the article is to be an airfoil for jet engine fan blades, the sheet may be aluminum alloy or titanium. On the other hand, if the airfoil is to be used as a turbine bucket subject to excessive heat, the covering sheet may be made of heat-resistant material such as titanium, stainless steel or other refractory metal or alloy.

As also shown in FIG. 1, flexible, consolidated, fiber-reinforced metal matrix tape 6 is fed from a tape supply reel 8 to the contoured surface of the base sheet 4. As each strip of tape is laid on the surface of the sheet, it is diffusion bonded to this sheet by means of a resistance-heated bonding roller 10. The tapes are laid side-by-side and layer-upon-layer until a stack of the desired shape and contour is built up. If desired, the tapes may also be laid diagonally or crosswise (transversely) and successive layer of the types may have the fibers crossplied. The bonding roller 10 bonds each tape to the tape below thereby preventing shifting of fibers and compacting the assembly to avoid the bulk of heretofore stacked resin-bonded laminae. Since the tape is laid side-by-side to form the desired shape of each layer, wastage of material is avoided and close dimensional tolerances are maintained.

The width of the tape 6 may vary, depending on the degree of twist and camber associated with the specific airfoil or other article being formed. Widths of from ⅛ to 1 inch are feasible, with wider tapes being useful where the twist and camber of the article is not appreciable. The tape may contain 25 to 60 volume per cent of filament having a diameter of about 4 to 8 mil. Where 4 mil filament is used the tape may have a thickness of 5 mils. Where 8 mil filament is used, the tape may be 8 to 10 mils in thickness.

The preferred tape 6 is a fiber-reinforced metal matrix composition prepared as shown and described in an article by John A. Alexander, the inventor named in this application, on pages 58–63 of the July, 1968 issue of Materials Engineering, which is incorporated herein by reference. As therein disclosed, metal matrix tapes are prepared by electro deposition or by chemical vapor deposition or by plasma spray deposition of the metal on filaments of refractory materials such as boron, boron silicon carbide, or silicon carbide. The tapes 6 may be composed of one or more layers of filaments 6a sandwiched in the matrix 6b. As shown in FIG. 2 the filaments 6a are in a mono-layer arrangement and run lengthwise of the tape, with the filaments spaced side-by-side and embedded in metal matrix 6b. However, the tape may contain more than one filament layer.

As illustrated in FIG. 3, a body 12 is built up from the tapes 6 on the base sheet 4 to provide the desired thickness and contour of the article being formed. As also shown, the base sheet 4 extends beyond the die or mandril 2. A cover sheet 14, preferably of the same material as the base sheet 4, is then laid over the body 12, with margins of the sheet extending therebeyond to cover the margins of the base sheet 4 as illustrated. These sheets preferably have a thickness of about 0.010 to 0.012 inch. A top mandril or die 16 contoured to the shape desired for the top face of the article being formed in pressed against the sheet 14 over the body 12. The margins of the base sheet 4 and cover sheet 14 extend beyond the mandrils 2 and 16 and are welded together at 18 to form a sealed envelope around the body 12 except for a small hole or opening 20 in one end of the assembly, as shown in FIG. 4. The body 12 is thus sheathed in a sealed envelope, which is then evacuated through the opening 20 to remove air and prevent oxidation in the envelope during final bonding and consolidation. The hole 20 is sealed after the envelope is sufficiently evacuated.

Since the body 12 is composed of consolidated tapes 6 which themselves are partially consolidated by the diffusion bonding during the building up of the body on the base sheet 4, final consolidation of the assembly in the die press between the mandrils or dies 2 and 16 occurs with only a small decrease in volume of the assembly, thereby further protecting against shifting of filaments 6a.

Where the material of the cover and base sheets and the matrix is a high melting material, such as titanium, the bonding for final consolidation is carried out at temperatures of about 1,650° to 1800° F., and at pressures of from 12,000 to 15,000 pounds per square inch. Where the metal or alloy of the cover foils and matrix metal is lower melting, such as an aluminum alloy, the diffusion bonding may be carried out at temperatures of 900° to 1,100° F. and pressures of from 4,000 to 9,000 pounds per square inch.

After the bonding operations, as shown in FIG. 5, the welded-together edges of the base and cover sheets 4 and 14 are trimmed off as flash 22.

As shown in FIG. 6, a finished airfoil 24 of this invention has a complete envelope or sheath 25 completely encasing a consolidated interior body 26, with the filaments 6a in the body extending lengthwise of the airfoil.

It will be appreciated that many different types of filaments can be used in the tapes and that refractory materials are highly desired for turbine engine components. Likewise, various metals and alloys such as aluminum, titanium, stainless steel, super alloys, such as disclosed in U.S. Pat. Nos. 3,005,705 and 2,146,136, and other refractory metals can be used as the matrix metal.

The method of this invention can be performed under control of a computer program providing for tape supply and advance, bonding, welding, and shearing. The method of the invention eliminates waste and reduces the number of steps required by heretofore necessary mat-winding and foil-forming. Decomposition of binder is avoided by providing fully consolidated tapes assembled and held together for direct insertion into the final diffusion pressure-bonding dies.

I claim as my invention:

1. The method of making composites of complicated airfoil shape which comprises forming a composite body from a plurality of layers, each layer composed of a plurality of flexible tapes in side-by-side relation, said tapes being composed of a metal matrix with reinforcing fibers embedded therein and diffusion-bonded together, forming an initial layer of said tapes in side-by-side relationship, heating and compacting each tape as it is laid down in side-by-side relation with an adjacent tape to diffusion-bond it to the underlying tapes, covering the body built up from the tapes with a metal foil to completely envelop the body, evacuating the resulting envelope, and hot pressing the assembly to integrate the entire assembly.

2. The method of preparing shaped composite articles comprising supporting a metal base sheet on a contoured die of the desired shape, said base sheet being contoured to correspond to said die, forming an initial layer of strips in side-by-side relationship, laying on said contoured sheet a plurality of layers of said strips in side-by-side relationship, said strips being laid in a pattern closely simulating the size and shape of the finished article, compacting and bonding each strip to the next preceding underlying layer before such strip is covered by a succeeding layer, covering said layers of strips with a metal cover sheet, subjecting the composite sheets and layers to heat and pressure between dies contoured to the desired shape and size to compress the composite to the desired shape and size and unite the edge of said base and cover sheets to each other and to bond the layers, base and cover sheets into integral relationship.

3. The method in accordance with claim 2 in which said strips are composed of fiber-reinforced metallic matrix.

4. The method in accordance with claim 3 in which said strips are diffusion bonded under heat and pressure.

5. The method in accordance with claim 4 in which the matrix is at least one metal or alloy from the group consisting of titanium, aluminum and titanium, stainless steel and super alloys.

6. The method in accordance with claim 5 in which the fiber is from the group consisting of boron, boron-silicon carbide and silicon carbide.

7. The method of making composites which comprises depositing on a base sheet contoured to the shape of a desired article, a layer containing a plurality of side-by-side flexible tapes composed of a metal matrix with reinforcing fibers embedded therein, superposing on such layer a plurality of similar layers until the desired thickness and contour is obtained, diffusion-bonding each layer to the layer immediately below by hot compacting prior to depositing the next successive layer, applying a covering sheet to the stacked, diffusion-bonded layers and hot pressing the assembly to unite the tapes, base sheet and covering into an integral body.

* * * * *